US012702924B2

(12) United States Patent
Yang et al.

(10) Patent No.: US 12,702,924 B2
(45) Date of Patent: Aug. 11, 2026

(54) METHOD AND APPARATUS FOR GAME ROLE INTERACTION CONTROL, STORAGE MEDIUM, AND ELECTRONIC DEVICE

(71) Applicant: BEIJING ZITIAO NETWORK TECHNOLOGY CO., LTD., Beijing (CN)

(72) Inventors: Yutong Yang, Beijing (CN); Guoan Han, Beijing (CN); Xueying Du, Beijing (CN); Jiaqi Shi, Beijing (CN); Chi Li, Beijing (CN); Bei Shi, Beijing (CN); Hongliang Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 302 days.

(21) Appl. No.: 18/466,912

(22) Filed: Sep. 14, 2023

(65) Prior Publication Data

US 2024/0123344 A1 Apr. 18, 2024

(30) Foreign Application Priority Data

Oct. 13, 2022 (CN) ........................ 202211255804.7

(51) Int. Cl.
*A63F 13/533* (2014.01)
*A63F 13/44* (2014.01)
(Continued)

(52) U.S. Cl.
CPC ............ *A63F 13/533* (2014.09); *A63F 13/44* (2014.09); *A63F 13/79* (2014.09); *A63F 13/822* (2014.09); *G06N 20/00* (2019.01)

(58) Field of Classification Search
CPC ........ A63F 13/533; A63F 13/44; A63F 13/79; A63F 13/822; A63F 13/46; A63F 13/67;
(Continued)

(56) References Cited

U.S. PATENT DOCUMENTS

2001/0041614 A1* 11/2001 Mizuno .................. A63F 13/40 463/36
2011/0113383 A1* 5/2011 Dyack ................ A63F 13/5252 715/850

(Continued)

FOREIGN PATENT DOCUMENTS

CN 113117331 A 7/2021
CN 113704423 A 11/2021
JP 2003-186816 A 7/2003

OTHER PUBLICATIONS

Notification of Grant of Patent Right received for Chinese Patent Application No. 202211255804.7, issued on Jan. 7, 2026, 6 pages (2 pages of English translation, 4 pages original document).

*Primary Examiner* — Kevin Y Kim
(74) *Attorney, Agent, or Firm* — Astute IP Law Group

(57) ABSTRACT

Related to are a method and apparatus for game role interaction control, a storage medium, and an electronic device. In the method, a target communication period of an intelligent agent may be dynamically adjusted by the current signal communication information triggered by a game match and the current game state information of the game match, to adjust the frequency of the intelligent agent for sending communication messages in the game match. Therefore, in the case of active communication of real players, the intelligent agent can be prevented from frequently sending communication messages, resulting in a conflict with the communication messages of the real players, and the interference of excessive communication messages on the real players can also be prevented. Moreover, in the case of no communication of the real players, the communication willingness of the real players can be motivated, thereby ensuring a good battle atmosphere for the game match.

14 Claims, 4 Drawing Sheets

(51) Int. Cl.

| | |
|---|---|
| ***A63F 13/79*** | (2014.01) |
| ***A63F 13/822*** | (2014.01) |
| ***G06N 20/00*** | (2019.01) |

(58) Field of Classification Search

CPC .................. A63F 13/87; A63F 2300/57; A63F 2300/807; G06N 20/00; G06N 3/006

See application file for complete search history.

(56) References Cited

U.S. PATENT DOCUMENTS

| | | | | |
|---|---|---|---|---|
| 2015/0121216 | A1* | 4/2015 | Brown | G06N 3/006 715/705 |
| 2018/0150749 | A1* | 5/2018 | Wu | G06N 5/04 |
| 2018/0367483 | A1* | 12/2018 | Rodriguez | H04L 65/60 |
| 2021/0031106 | A1* | 2/2021 | Alderman | A63F 13/35 |
| 2021/0373676 | A1* | 12/2021 | Jorasch | A63F 13/215 |

* cited by examiner

METHOD AND APPARATUS FOR GAME ROLE INTERACTION CONTROL, STORAGE MEDIUM, AND ELECTRONIC DEVICE

CROSS-REFERENCE TO RELATED APPLICATION(S)

This application claims priority to Chinese Patent Application No. 202211255804.7 filed Oct. 13, 2022, the disclosure of which is incorporated herein by reference in its entirety.

FIELD

The present disclosure relates to the technical field of computers, and in particular to a method and apparatus for game role interaction control, a storage medium, and an electronic device.

BACKGROUND

In the electronic game industry, the application of artificial intelligence (AI) to games has become a developing trend. With the iteration of the game AI technology, game AI may serve as both a competitor of human players and a gaming partner to fight shoulder to shoulder with the human players in electronic games, which is of great significance for improving the game experience and the activity of players.

However, the existing game AI may only send communication messages at preset time intervals, resulting in extremely mechanized communication between the game AI and real players in game matches, making it impossible to simulate the communication of real players.

SUMMARY

The Summary is provided to introduce concepts in a brief form, and these concepts will be described in detail in the following Detailed Description. The Summary is not intended to identify key features or essential features of the claimed technical solutions, nor is it intended to be used to limit the scope of the claimed technical solutions.

In a first aspect, embodiments of the present disclosure provide a method for game role interaction control, including: determining a target communication message to be sent by an intelligent agent in a game match; determining, based on current signal communication information triggered by the game match and current game state information of the game match, a target communication period corresponding to the intelligent agent; and in response to a time interval between a moment at which the intelligent agent sends a previous communication message and a current moment matching the target communication period, controlling the intelligent agent to send the target communication message.

In a second aspect of the present disclosure, embodiments of the present disclosure provide an apparatus for game role interaction control, including a first determination module, a second determination module, and a control module.

The first determination module is configured to determine a target communication message to be sent by an intelligent agent in a game match.

The second determination module is configured to determine, based on current signal communication information triggered by the game match and current game state information of the game match, a target communication period corresponding to the intelligent agent.

The control module is configured to control, in response to a time interval between a moment at which the intelligent agent sends a previous communication message and a current moment matching the target communication period, the intelligent agent to send the target communication message.

In a third aspect, embodiments of the present disclosure provide a non-transitory computer-readable storage medium storing a computer program thereon, the program when executed by a processor, implements the steps of the method in the first aspect.

In a fourth aspect, embodiments of the present disclosure provide an electronic device, including a memory and a processor.

The memory stores a computer program thereon.

The processor is used for executing the computer program in the memory to implement the steps of the method in the first aspect.

Based on the above technical solutions, by the current signal communication information triggered by the game match and the current game state information of the game match, the target communication period of the intelligent agent may be dynamically adjusted, to adjust the frequency of the intelligent agent for sending the communication messages in the game match. Therefore, in the case of active communication of real players, the intelligent agent can be prevented from frequently sending communication messages, resulting in a conflict with the communication messages of the real players, and the interference of excessive communication messages on the real players can also be prevented. In addition, in the case of no communication of the real players, the communication willingness of the real players can be motivated, thereby ensuring a good battle atmosphere for the game match.

Other features and advantages of the present disclosure will be described in detail in the following Detailed Description.

BRIEF DESCRIPTION OF THE DRAWINGS

The above and other features, advantages and aspects of various embodiments of the present disclosure will become more apparent with reference to the drawings and with reference to the following Detailed Description. Throughout the drawings, the same or similar reference signs refer to the same or similar elements. It should be understood that the drawings are schematic, and members and elements are not necessarily drawn to scale. In the drawings.

DETAILED DESCRIPTION OF EMBODIMENTS

Figure 1:
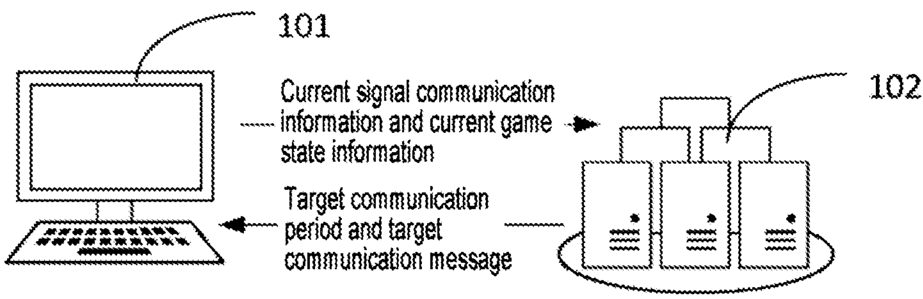
FIG. 1 is a schematic diagram illustrating a scenario of a method for game role control according to an exemplary embodiment.

Embodiments of the present disclosure will be described in more detail below with reference to the drawings.

Although some embodiments of the present disclosure are shown in the drawings, it should be understood that the present disclosure may be implemented in various forms and should not be construed as being limited to the embodiments set forth herein, but rather these embodiments are provided for a more thorough and complete understanding of the present disclosure. It should be understood that the drawings and the embodiments of the present disclosure are merely for illustrative purposes and are not intended to limit the protection scope of the present disclosure.

It should be understood that, various steps recorded in the method embodiments of the present disclosure may be executed in different orders, and/or executed in parallel. In addition, the method embodiments may include additional steps and/or omit the shown steps. The scope of the present disclosure is not limited in this regard.

The term "including" and variations thereof as used herein mean open-ended inclusions, that is, "including but not limited to". The term "based on" means "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that, the concepts such as "first" and "second" mentioned in the present disclosure are only used to distinguish different apparatuses, modules or units, and are not used to limit the order or interdependency relationship of functions executed by these apparatuses, modules or units.

It should be noted that, the modification of "one" and "a plurality of" mentioned in the present disclosure is schematic and non-restrictive, and it should be understood by those skilled in the art that, unless the context clearly indicates, the modification should be understood as "one or more."

The names of messages or information exchanged among a plurality of apparatuses in the embodiments of the present disclosure are only used for illustrative purposes, and are not intended to limit the scope of these messages or information.

It can be understood that, before the technical solutions disclosed in the various embodiments of the present disclosure are used, the type, the usage range, the usage scenario and the like of personal information involved in the present disclosure should be informed to a user in an appropriate manner according to relevant laws and regulations, and the authorization of the user is obtained.

For example, when the user uses game AI in a game match, prompt information is sent, in response to an active request from the user being received, to the user to clearly prompt the user that an operation which the user requests to execute needs to acquire and use the personal information of the user, such as information in the game match. Thus, the user can autonomously select, based on the prompt information, whether to provide the personal information for software or hardware which executes the operations in the technical solutions of the present disclosure, such as an electronic device, an application program, a server, or a storage medium.

As an optional but non-restrictive implementation, in response to the active request of the user being received, the prompt information may be sent to the user in a manner of, for example, a pop-up window, and the prompt information may be presented in the pop-up window in a text manner. In addition, the pop-up window may also carry a selection control for the user to select to "agree" or "disagree" to provide the personal information for the electronic device.

It can be understood that, the above process of notifying and acquiring the authorization of the user is only schematic and does not constitute limitations on the implementations of the present disclosure, and other manners satisfying related laws and regulations may also be applied to the implementations of the present disclosure.

Meanwhile, it can be understood that, data (including but not limited to the data itself, the acquisition or use of the data) involved in the present technical solution should follow the requirements of corresponding laws and regulations and related specifications.

1) A game role, which may also be referred to as a virtual object and may be referred to as a hero in some games, refers to a movable object in a game. The movable object may be at least one of a virtual character, a virtual animal and a cartoon character. Optionally, when the game environment is a three-dimensional game environment, the game role is a three-dimensional model, and each game role has its own shape and volume in the three-dimensional game environment, and occupies a part of space in the three-dimensional game environment. Optionally, the game role may be a hero character, a soldier or a neutral organism in a battle game, and in the embodiments of the present application, it is taken as an example for illustration that the game role is a hero character.

2) An intelligent agent, which may also be referred to as a game AI or may be referred to as a human machine, refers to a game role capable of interacting with the game environment in the game. For example, the intelligent agent may communicate, cooperate or battle with other intelligent agents in a certain specific game environment based on its own perception on the game environment and in accordance with existing indications or by autonomous learning, and autonomously complete a set target in the game environment where the intelligent agent is located. It should be understood that, the behaviors of the intelligent agent in the game are controlled by artificial intelligence suitable for the game, and various behaviors may be simulated on the basis of the requirements of the game.

The technical solutions of the present disclosure will be further described in detail below in combination with the drawings and specific embodiments.

FIG. 1 is a schematic diagram illustrating a scenario of a method for game role control according to an exemplary embodiment. As shown in FIG. 1, the method for game role control provided in embodiments of the present disclosure is applicable to the application scenario shown in FIG. 1, and the application scenario may include a plurality of terminals 101 and a server 102. The terminals 101 and the server 102 may perform data interaction by a wired or wireless connection.

The server 102 may be the server 102 of a game platform, and the terminal 101 accesses the server 102 by a game client, so as to play a game. For example, a game player may log in the game by the game client, and select a competitive mode, a competitive teammate, a competitive opponent, and the like, to play the game. The competitive teammate and/or the competitive competitor may be an intelligent agent, that is, a game match running by the terminal 101 may be a human-computer battle mode, or a battle mode in which the intelligent agent participates.

Taking the human-computer battle mode as an example, in the human-computer battle mode, the terminal 101 may collect the current signal communication information and the current game state information of the game match, and send the current signal communication information and the current game state information to the server 102. Based on the current signal communication information and the current game state information sent by the terminal 101, the server 102 may determine a target communication period corresponding to the intelligent agent. Moreover, the server 102 may further determine a target communication message to be sent by the intelligent agent, and then the server 102 sends the target communication period and the target communication message to the terminal 101, such that in response to a time interval between a moment at which the intelligent agent sends a previous communication message and the current moment matching the target communication period, the terminal 101 controls the intelligent agent to send the target communication message.

Of course, in an actual application process, the terminal 101 may also independently execute the method for game role interaction control provided in the embodiments of the present disclosure.

Figure 2:
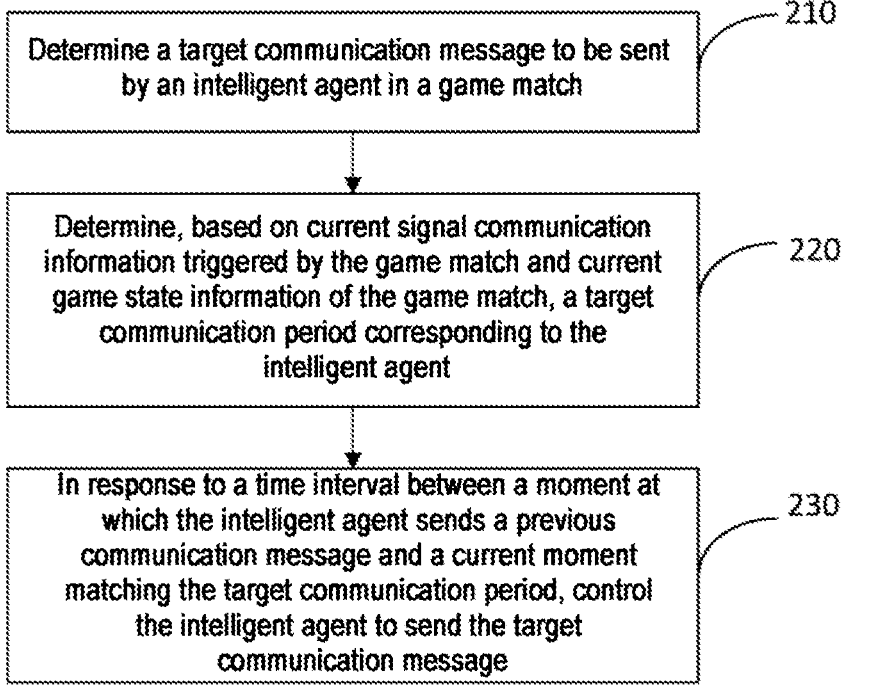
FIG. 2 is a flowchart illustrating a method for game role interaction control according to an exemplary embodiment.

FIG. 2 is a flowchart illustrating a method for game role interaction control according to an exemplary embodiment. The method may be executed by the server 102 or the terminal 101 in FIG. 1. As shown in FIG. 2, the method for game role interaction control may include the following steps.

In step 210, a target communication message to be sent by an intelligent agent in a game match is determined.

Here, the game match may be a match of a battle game, and the game match may be a match composed of a real player and an intelligent agent. The intelligent agent may serve as a teammate or an opponent of the real player in the game match. Of course, the game match may be a match which is completely composed of real players at the beginning, but in the process of game play, the intelligent agent replaces one or more real players to control the game roles since the one or more real players exit.

The target communication message refers to a communication message which is to be sent by the intelligent agent and used for enabling a player role in the game match to know a game action to be executed by the intelligent agent. The intelligent agent may be an intelligent agent which belongs to the same game camp as the player role.

It should be understood that, the target communication message may include the content of the communication message and the manner of sending the communication message, that is, which type of communication message is sent in which type of signal. For example, a communication message of "attack XXX building" is output in a label manner, a communication message of "give me some 5.56 bullets" is output in a text manner, or a communication message of "request support" is output in a voice form.

It is worth noting that, the detailed process of obtaining the target communication message will be described in detail in subsequent embodiments. In addition, in the embodiment of the present disclosure, the target communication message refers to a communication message corresponding to the intelligent agent which belongs to the same game camp as the player role. For an intelligent agent which belongs to a different game camp from the player role, it is unnecessary to determine the target communication message of the intelligent agent. The intelligent agent belonging to the same game camp as the player role refers to that the intelligent agent belongs to the same team as the player role, and the intelligent agent and a player role controlled by a real player belong to teammates.

In step 220, a target communication period corresponding to the intelligent agent is determined based on the current signal communication information triggered by the game match and the current game state information of the game match.

Here, the signal communication information includes at least one of the following: the content of a communication message triggered by a game role in the game match and a type of signal to which the communication message belongs.

The content of the communication message triggered by the game role refers to the content of the communication message sent by the game role. The communication message may be a communication signal of a label type, such as an attack signal, a withdrawal signal, and the like, and of course, the communication message may also be a voice signal sent in a voice type, a text signal sent in a text type, and the like. The type of signal to which the communication message belongs may be a communication message of the label type, the voice type, the text type, and the like. It is worth noting that, the communication message triggered by the game role may refer to a communication message triggered by the player role and/or other intelligent agents. Of course, for the human-computer battle mode, the game experience of the real player may be preferentially considered, and then the communication message triggered by the game role may particularly refer to a communication message triggered by the player role.

It should be understood that, the signal communication information of the game match refers to feature information used for reflecting a communication behavior state between the game roles in the game match. The signal communication information changes over time in the game match, the signal communication information corresponding to the current moment may be referred to as the current signal communication information, and generally, the signal communication information at the current moment is acquired, to determine the target communication content of the intelligent agent based on the current communication behavior state.

Optionally, the game state information includes at least one of the following: role state data of the game role of the game match, a game progress where the game match is located, and a game environment where the game role is located.

The role state data of the game role may include a game camp to which the game role belongs, such as a blue party, a red party, or belonging to a different team. The role state data of the game role may include data such as a health point (HP) of the game role, a mana point (MP) of the game role, a skill state, an economic state, equipment, etc. Of course, the role state data may also be represented by other forms of data, for example, the role state data may be a ratio of remaining life values between the game roles, an economic ratio, etc.

The game progress where the game match is located refers to the current time of the game match, for example, the game match is performed for 30 minutes. Of course, the game progress where the game match is located may also refer to a stage where the game match is located, for example, an early stage, a medium stage, a later stage, a last stage, etc. The stage where the game match is located may be divided based on the current time of the game match. For example, a time period of 0-10 minutes is divided as the early stage, a time period of 10-28 minutes is divided as the medium stage, a time period of 28-40 minutes is divided as the later stage, and a time period after 40 minutes is divided as the last stage.

The game environment where the game role is located refers to the terrain, position, the distance between the game roles, and the like in a game map where the game role is located.

It should be understood that, the game state information of the game match refers to feature information capable of reflecting the game situation of the game match. The game state information changes over time in the game match, the game state information corresponding to the current moment may be referred to as the current game state information, and generally, the game state information at the current moment is acquired, to determine the target communication message of the intelligent agent based on the current game situation.

The target communication period is an indicator for representing the frequency of the intelligent agent for sending communication messages, and the shorter the target communication period is, the more frequently the intelligent agent sends the communication messages. For example, when the target communication period is 100 s, it indicates that the intelligent agent may send communication messages every 100 s or more, and when the target communication period is 10 s, it indicates that the intelligent agent may send communication messages every 10 s or more.

The current game state of the game match may be described and modeled by the current signal communication information and the current game state information, to obtain the target communication period of the intelligent agent which may be suitable for the current game state. For example, in the case where the current game state represents that the real players communicate actively, the target communication period of the intelligent agent may be increased, such that the intelligent agent reduces sending communication messages, thereby avoiding a conflict with the communication messages from the real players, and preventing excessive communication messages from interfering with the real players. In the case where the current game state represents that the real players communicate scarcely, the target communication period of the intelligent agent may be decreased, such that the intelligent agent increases sending communication messages, thereby motivating the communication willingness of the real players, and thus ensuring that the game match can have a good battle atmosphere.

It is worth noting that, based on different game states, the target communication period is different, that is, in a game match, the target communication period may be changed along with the game state at any time. Of course, for the requirement of reducing the calculation amount, a time period may be set, the target communication period may remain unchanged within the time period, and when the next time period is entered, a new target communication period may be recalculated as a target communication period of this time period. For example, three minutes are taken as a time period, and the target communication period is updated once every 3 minutes when the game match is performed.

In step 230, in response to a time interval between a moment at which the intelligent agent sends a previous communication message and the current moment matching the target communication period, the intelligent agent is controlled to send the target communication message.

Here, the moment at which the intelligent agent sends the previous communication message may refer to a moment at which the intelligent agent sends a communication message most recently. For example, the moment at which the intelligent agent sends the communication message most recently is a game match time 31:02. Of course, the moment at which the intelligent agent sends the previous communication message may refer to a moment at which the intelligent agent sends a communication message consistent with the type of signal of the target communication content most recently. For example, the moments at which the intelligent agent sends communication messages the two most recent are game match times 31:02 and 33:02, the type of signal of the communication message sent at 31:02 is "attack", and the type of signal of the communication message sent at 33:02 is "withdraw". When the type of signal of the target communication message is "attack", the moment at which the intelligent agent sends the previous communication message is 31:02.

It should be understood that, the above embodiments provide two methods for determining the moment at which the intelligent agent sends the previous communication message, and one of which may be selected for use according to the actual situations in an actual application process.

The time interval matching the target communication period may refer to that the time interval is greater than or equal to the target communication period. For example, when the target communication period is 50 s, the time interval is greater than or equal to 50 s, and then the intelligent agent is controlled to send the target communication message. It is worth noting that, the time interval matching the target communication period actually indicates that the intelligent agent may send a communication message at the current moment.

The target communication message may include the content of the communication message and the manner of sending the communication message, and the communication message may be output in a target form. For example, when the target communication message corresponding to the intelligent agent is a communication message of "request support" output in a voice form, the communication message of "request support" is output in a user interface in the voice form. By outputting the target communication message, the player role in the game match may determine, based on the target communication message, a game action to be executed by the intelligent agent, so that the player role can cooperate with the intelligent agent.

It is worth noting that, in response to the time interval not matching the target communication period, the target communication message may be discarded. For example, when the target communication period is 50 s, if the time interval is less than 50 s, the intelligent agent does not send the target communication message. Since the target communication message has timeliness, the communication message can be discarded.

Therefore, the target communication period of the intelligent agent can be dynamically adjusted by the current signal communication information triggered by the game match and the current game state information of the game match, to adjust the frequency of the intelligent agent for sending communication messages in the game match. Therefore, in the case of active communication of real players, the intelligent agent can be prevented from frequently sending communication messages, resulting in a conflict with the communication messages of the real players, and the interference of excessive communication messages on the real players can also be prevented. In addition, in the case of no communication of the real players, the communication willingness of the real players can be motivated, thereby ensuring a good battle atmosphere for the game match.

It is worth noting that, in the above embodiment, the target communication message may be determined based on a preset time interval, and when it is determined that the intelligent agent needs to send the target communication message, the target communication period corresponding to the intelligent agent is further determined based on the current signal communication information and the current game state information. Then, in response to the time interval between the moment at which the intelligent agent sends the previous communication message and the current moment matching the target communication period, the intelligent agent is controlled to send the target communication message.

In some implementable implementations, the game state information and the signal communication information of the game match may be acquired. A game intention of the intelligent agent may be determined based on the game state information, and the game intention represents a battle target of the intelligent agent. The target communication message corresponding to the intelligent agent may be obtained by inputting the game state information, the signal communication information and the game intention into a communication prediction model.

Here, since the game state information reflects the current game situation of the game match, the game intention of the intelligent agent under the current game situation may be obtained based on the game state information. The game intention refers to a battle target to be implemented by the intelligent agent. The battle target may refer to a map area, a strategic point, or a map resource to be defended/attacked by the intelligent agent. For example, the battle target of the intelligent agent may be to help the player role to arrest a player, protect the player role, attack a certain resource point, be responsible for alerting the player role, attack a specific monster in the game, acquire the field of view of a dark area of the game map, exclude a visual guard in the game map, cooperate with the player role to execute a certain game strategy, etc.

Exemplarily, the game intention may be obtained by inputting the game state information into an intention prediction model. The intention prediction model may include an input layer, a hidden layer and an output layer, and a neural network model outputs the game intention on the basis of a strategy function and based on the input game state information. The output game intention may be adjusted by adjusting the parameters of the hidden layer.

The target communication message output by the communication prediction model may be obtained by inputting the game state information, the signal communication information and the game intention of the intelligent agent into the communication prediction model, and the communication prediction model may be a neural network model.

It should be understood that, the target communication message matching the current game situation, the communication behavior state of the game role and the battle target of the intelligent agent may be acquired by the game state information, the signal communication information and the game intention. The target communication message may reflect the game intention of the intelligent agent, so that the real player can understand the game intention of the intelligent agent, thereby cooperating with the intelligent agent.

As some other examples, the target communication message is determined based on a communication message triggered by the player role in the signal communication information, and in combination with a mapping relationship between the communication message sent by the player role and the content of the intelligent agent replying to the communication message.

The mapping relationship may be a communication message pair, and the communication message pair includes the content of a communication message sent by the player role and the content of the intelligent agent for replying to the communication message sent by the player role. For example, "request support"—"on the way" constitute a communication message pair. When the player role sends the communication message of "request support", the target communication message may be "on the way".

It is worth noting that, the above embodiments only provide two methods for determining the target communication message as a reference, and in an actual application process, the target communication message may also be determined in other manners, which will not be exemplified one by one in the present disclosure.

Figure 3:
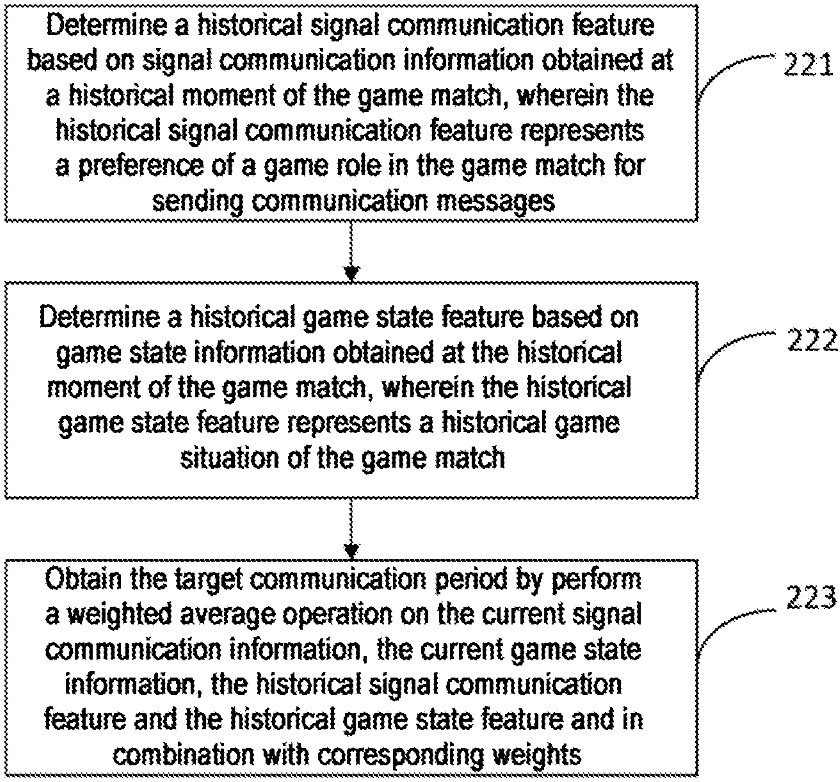
FIG. 3 is a detailed flowchart of a step 220 shown in FIG. 2.

FIG. 3 is a detailed flowchart of the step 220 shown in FIG. 2. As shown in FIG. 3, in some implementable implementations, the step 220 may include the following steps:

In step 221, a historical signal communication feature is determined based on signal communication information obtained at a historical moment of the game match, and the historical signal communication feature represents the preference of the game role in the game match for sending communication messages.

Here, the signal communication information is original signal communication information acquired in the game match, and the historical signal communication feature is obtained after the original signal communication information is processed. The signal communication information obtained at the historical moment may refer to signal communication information acquired at all moments before the current moment. For example, if the current moment is 32:01, the signal communication information obtained at the historical moment is all signal communication information obtained within a time period between 00:00 and 32:01. Of course, the signal communication information obtained at the historical moment may refer to all signal communication information acquired within a preset time period before the current moment. For example, if the current moment is 32:01, and the preset time period is 60 seconds, then the signal communication information obtained at the historical moment may be all signal communication information obtained between 31:01 and 32:01.

Exemplarily, the signal communication feature includes at least one of the following: the frequency of the game role in the game match for sending communication messages, the number of times of the game role for sending communication messages, and a time point at which the game role sends communication messages.

Here, when the signal communication feature is the frequency of the game role for sending communication messages, the frequency of the game role for sending communication messages may be counted in the signal communication information obtained at the historical moment. The frequency of the game role for sending communication messages may refer to the frequency of the player role for sending communication messages of a preset type, and may also refer to the frequency of the player role for sending communication messages of all types.

When the signal communication feature is the number of times of the game role for sending communication messages, the number of times of the game role for sending communication messages may be counted in the signal communication information obtained at the historical moment. The number of times of the game role for sending communication messages may refer to the total number of times of the player role for sending communication messages of a preset type, and may also refer to the total number of times of the player role for sending communication messages of all types.

When the signal communication feature is the time point at which the game role sends communication messages, each time point at which the game role sends a respective communication message may be counted in the signal communication information obtained at the historical moment. Of course, the time point may also be represented by a stage where the game match is located, such as an early stage, a medium stage, a later stage, a last stage, etc. The communication willingness of the player role in each stage of the game match may be determined by the time point at which the game role sends communication messages.

It is worth noting that, the historical signal communication feature actually represents the preference of the player role for sending communication messages. For example, when the historical signal communication feature represents that the player role frequently sends communication messages in the process of the game match, it indicates that the player role is willing to communicate with teammates in the game match or is willing to command the game.

In step 222, a historical game state feature is determined based on game state information obtained at the historical moment of the game match, and the historical game state feature represents a historical game situation of the game match.

Here, the game state information is original game state information acquired in the game match, and the historical game state feature is obtained after the original game state information is processed. The game state information obtained at the historical moment may refer to game state information acquired at all moments before the current moment. For example, if the current moment is 32:01, the game state information obtained at the historical moment is all game state information obtained within a time period between 00:00 and 32:01. Of course, the game state information obtained at the historical moment may refer to all game state information acquired within a preset time period before the current moment. For example, if the current moment is 32:01 and the preset time period is 60 seconds, then the game state information obtained at the historical moment may be all game state information obtained between 31:01 and 32:01.

Exemplarily, the game state feature includes at least one of the following: a first situational indicator for representing a winning or losing trend of the game match, and a second situational indicator used for representing the battle advantages and disadvantages between the game roles.

Here, the first situational indicator may be determined by data such as the difference between kill counts of an own camp and an opponent camp, a total economic difference, the strong stage of a team lineup, and the like. The first situational indicator represents the winning or losing trend between the own camp and the opponent camp in the game match. For example, the first situational indicator may represent winning rates of the own camp and the opponent camp, for example, if the winning rate of the own camp is 70% and the winning rate of the opponent camp is 30%, it indicates that the game situation of the own camp belonging to the player role develops good in the present game match.

The second situational indicator may be determined by data such as the difference between kill counts of various game roles, a total economic difference, an equipment difference, the strong stages of the game roles, and the like. The second situational indicator represents the battle advantages and disadvantages of the game roles. For example, the second situational indicator may represent battle winning rates between the game roles, such as, a battle winning rate of the player role with respect to the intelligent agent in the opponent camp.

It is worth noting that, the historical game state feature actually reflects the game situation trend of the game match at the historical moment.

In step 223, the target communication period by performing a weighted average operation on the current signal communication information, the current game state information, the historical signal communication feature and the historical game state feature and in combination with corresponding weights.

Here, by determining the target communication period based on the current signal communication information, the current game state information, the historical signal communication feature and the historical game state feature, the game state of the game match can be better described and modeled, on the basis of the game situation trend of the game match at the historical moment and the communication willingness change direction of the player role at the historical moment and in combination with the current game situation and the signal sent by the current player role, so that the target communication period of the intelligent agent in the current game state is accurately predicted.

For example, by the historical signal communication feature, the frequency of the intelligent agent for sending communication messages may be controlled via using the frequency of the player role for sending communication messages in the past.

Exemplarily, the target communication period may be calculated by the following calculation formula:

$$h=(aX+bY+cZ+dG)/4$$

h denotes the target communication period, X denotes the current signal communication information, Y denotes the current game state information, Z denotes the historical signal communication feature, G denotes the historical game state feature, and a, b, c and d respectively denote corresponding weights.

It is worth noting that, h may be an interval value, for example, a value between 0 and 10, and different intervals where h is located may correspond to different target communication periods. For example, an interval [0, 1] corresponds to 100 s, an interval [1, 2] corresponds to 90 s, an interval [2, 3] corresponds to 80 s, etc.

Therefore, by determining the target communication period based on the current signal communication information, the current game state information, the historical signal communication feature and the historical game state feature, the game state of the game match can be better described and modeled, on the basis of the game situation trend of the game match at the historical moment and the communication willingness change direction of the player role at the historical moment, so that the target communication period of the intelligent agent in the current game state is accurately predicted.

Figure 4:
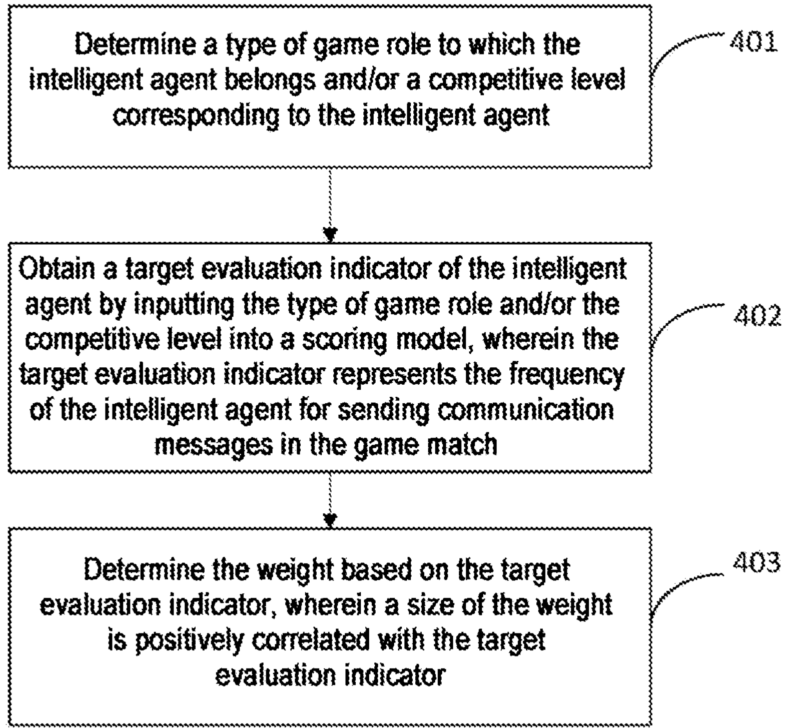
FIG. 4 is a flowchart of determining a weight illustrated according to an exemplary embodiment.

FIG. 4 is a flowchart of determining a weight illustrated according to an exemplary embodiment. As shown in FIG. 4, in some implementable implementations, the weight of the above calculation formula may be obtained by the following steps:

In step 401, a type of game role to which the intelligent agent belongs and/or a competitive level corresponding to the intelligent agent is determined.

Here, the type of game role to which the intelligent agent belongs may refer to a hero attribute of the intelligent agent. The attributes of the types of the game roles may be divided based on different positions of the game roles in the game, such as a jungle hero, a bot-laner hero, a mid-laner hero and a top-laner hero. The jungle hero fights in a wild area, the bot-laner hero cooperates the battle on a bot laner, for example, an auxiliary hero and a shooter hero may be bot-laner heroes, the mid-laner hero fights on the middle laner, and the top-laner hero fights on the top laner. As another example, in an FPS (First Personal Shooting Game), each game camp (the same team) may include four types of game role, such as a command position, an assault position, a sniper position and a support position. The command position is responsible for sending instructions of total team behaviors, which are divided into search, alert, attack, withdrawal, select a movement direction, and the like. The assault position is responsible for attack as well as damage resistance. The sniper position is responsible for killing opponents at a long distance. The support position is responsible for reconnaissance, alert, and logistics.

The competitive level of the intelligent agent refers to the competitive performance of the intelligent agent in the present game match, and the higher the competitive level is, the better the competitive performance of the intelligent agent in the present game match is. The competitive level of the intelligent agent may be evaluated by a KDA (KILL DEATH ASSIST) value, economy, level, equipment and the like of the intelligent agent. For example, the higher the KDA value, the level and the economy are or the better the equipment is, the higher the competitive level of the intelligent agent is.

In step 402, a target evaluation indicator of the intelligent agent is obtained by inputting the type of game role and/or the competitive level into a scoring model, and the target evaluation indicator represents the frequency of the intelligent agent for sending communication messages in the game match.

Here, the scoring model may be a neural network model. The scoring model may include an input layer, a hidden layer and an output layer, and the scoring model outputs the target evaluation indicator on the basis of a strategy function and based on the type of game role and/or the competitive level. The output target evaluation indicator may be adjusted by adjusting the parameters of the hidden layer.

It is worth noting that, the scoring model may be obtained by training a machine learning model over training samples of types of historical game role and/or competitive levels, which are labeled with different evaluation indicators (such as scores).

The target evaluation indicator represents the frequency of the intelligent agent for sending communication messages in the game match. For example, the greater the target evaluation indicator is, the higher the frequency of the intelligent agent for sending communication messages may be.

It should be understood that, the frequencies of different intelligent agents for sending communication messages in the game match may be determined by the type of game role and/or the competitive level. For example, for an intelligent agent with a higher competitive level, the frequency of this intelligent agent for sending communication messages is higher; and for an intelligent agent with a lower competitive level, the frequency of this intelligent agent for sending communication messages is lower. As another example, for intelligent agents of different types of game role, the frequencies of these intelligent agents for sending communication messages may be different. For example, the frequency of an intelligent agent of which the type of game role is the command position for sending communication messages may be higher than that of an intelligent agent of which the type of game role is the support position.

In step 403, the weight is determined based on the target evaluation indicator, and the size of the weight is positively correlated with the target evaluation indicator.

Here, the weight used in weighted average is positively correlated with the target evaluation indicator, that is, the greater the target evaluation indicator is, the greater the weight is. Correspondingly, the greater the weight is, the higher the frequency of the intelligent agent for sending communication messages is.

Therefore, the weight of the weighted average is determined by the type of game role to which the intelligent agent belongs and/or the competitive level corresponding to the intelligent agent, and the frequency of the intelligent agent for sending communication messages may be dynamically adjusted based on the hero attribute to which the intelligent agent belongs and/or the battle performance of the intelligent agent in the game match, so that the intelligent agent with good battle performance can send more communication messages, and the intelligent agent with poor battle performance can fewer communication messages, thereby improving the game experience of the real players.

In some embodiments, in step 403, the current game progress of the game match may be determined, and the weight is determined based on the current game progress and the target evaluation indicator.

The game progress has been described in detail in the above embodiments, and thus details are not described herein again. Different parameter values may be set for different current game progresses. Generally speaking, the latter the current game progress is, the greater the parameter value is. For example, the game progress may be divided into an early stage, a middle stage, a later stage and a last stage. In the early stage of the game match, growth or equipment search mainly dominates, and thus the intelligent agent sends fewer communication messages. In the middle stage, the later stage and the last stage, team fight mainly dominates, and thus the intelligent agent may send more communication messages.

After the current game progress is determined, an adjusted target evaluation indicator may be obtained by multiplying the parameter value corresponding to the current game progress by the target evaluation indicator, and then the weight is obtained based on the target evaluation indicator.

On this basis, the target communication period of the intelligent agent for sending communication messages at different game progresses may be further adjusted by the game progress, so that the intelligent agent can send the target communication message at a proper opportunity to avoid interference to the real players.

In some implementable implementations, the target communication period may be obtained by inputting the current signal communication information and the current game state information into a trained model for period prediction.

The model for period predication is obtained by training the machine learning model over training samples, and the training samples include signal communication information labeled with a communication period, and game state information.

The training samples may be acquired from a historical game match. The historical game match may refer to a game consisting of real players, and for each historical game match, signal communication information and game state information within a preset time period are extracted from the historical game match. The preset time period may be a preset duration, for example, 5 seconds. Then, a communication period corresponding to the signal communication information and the game state information may be determined based on a period of the real players for sending communication messages within the preset time period, so as to obtain the training samples.

Figure 5:
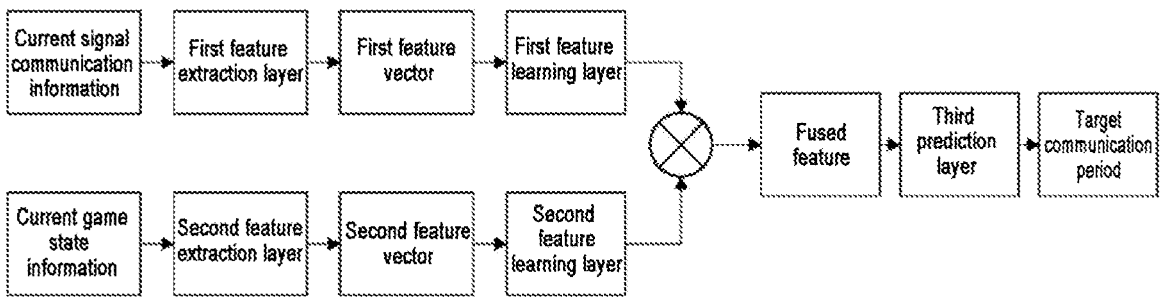
FIG. 5 is a structural diagram illustrating a model for period prediction according to an exemplary embodiment.

FIG. 5 is a structure diagram illustrating the model for period prediction according to an exemplary embodiment. As shown in FIG. 5, the model for period prediction includes a first feature extraction layer, a second feature extraction layer, a first feature learning layer, a second feature learning layer, a fusion layer and a prediction layer.

The first feature extraction layer is configured to extract a first feature vector from the current signal communication information.

The second feature extraction layer is configured to extract a second feature vector from the current game state information.

The first feature learning layer is configured to obtain a third feature vector based on the first feature vector and a first historical feature vector memorized by the first feature learning layer, and the first historical feature vector is obtained by the first feature learning layer based on signal communication information historically input into the model for period prediction.

The second feature learning layer is configured to obtain a fourth feature vector based on the second feature vector and a second historical feature vector memorized by the second feature learning layer, and the second historical feature vector is obtained by the second feature learning layer based on game state information historically input into the model for period prediction.

The fusion layer is configured to obtain a fused feature by fusing the third feature vector and the fourth feature vector.

The prediction layer is configured to determine the target communication period based on the fused feature.

Here, the first feature extraction layer and the second feature extraction layer may be coding layers, which extract features from the current signal communication information and the current game state information, and code the same to form the first feature vector and the second feature vector.

The first feature learning layer and the second feature learning layer may be long short-term memory networks (LSTM). The long short-term memory network memorizes information input into the network, that is, the long short-term memory network determines the historical signal communication feature based on the signal communication information obtained at the historical moment of the game match, or determines the historical game state feature based on the game state information obtained at the historical moment of the game match. The fusion layer is configured to obtain the fuse feature by splicing the third feature vector with the fourth feature vector.

It is worth noting that, since the current signal communication information and the current game state information are both one-dimensional features, the current signal communication information and the current game state information may be combined for processing. Then, the first feature extraction layer and the second feature extraction layer are combined into one layer of network, and the first feature learning layer, the second feature learning layer and the fusion layer may also be combined into one layer of network.

Figure 6:
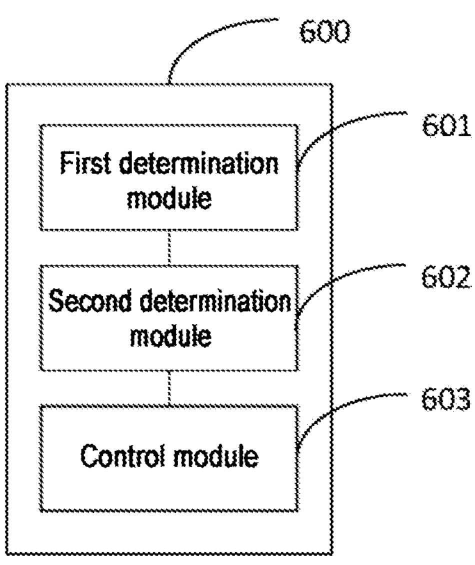
FIG. 6 is a schematic structural diagram illustrating an apparatus for game role interaction control according to an exemplary embodiment.

FIG. 6 is a schematic structural diagram illustrating an apparatus for game role interaction control according to an exemplary embodiment. As shown in FIG. 6, embodiments of the present disclosure provide an apparatus for game role interaction control, and the apparatus 600 includes a first determination module 601, a second determination module 602, and a control module 603.

The first determination module 601 is configured to determine a target communication message to be sent by an intelligent agent in a game match.

The second determination module 602 is configured to determine, based on current signal communication information triggered by the game match and current game state information of the game match, a target communication period corresponding to the intelligent agent.

The control module 603 is configured to control, in response to a time interval between a moment at which the intelligent agent sends a previous communication message and the current moment matching the target communication period, the intelligent agent to send the target communication message.

Optionally, the second determination module 602 includes a first determination unit, a second determination unit, and a third determination unit.

The first determination unit is configured to determine a historical signal communication feature based on signal communication information obtained at a historical moment of the game match, and the historical signal communication feature represents the preference of a game role in the game match for sending communication messages;

The second determination unit is configured to determine a historical game state feature based on game state information obtained at the historical moment of the game match, and the historical game state feature represents a historical game situation of the game match.

The third determination unit is configured to obtain the target communication period by performing a weighted average operation on the current signal communication information, the current game state information, the historical signal communication feature and the historical game state feature and in combination with corresponding weights.

Optionally, the third determination unit includes an attribute determination unit, an evaluation unit, and a weight determination unit.

The attribute determination unit is configured to determine a type of game role to which the intelligent agent belongs and/or a competitive level corresponding to the intelligent agent.

The evaluation unit is configured to obtaining a target evaluation indicator of the intelligent agent by inputting the type of game role and/or the competitive level into a scoring model, and the target evaluation indicator represents the frequency of the intelligent agent for sending communication messages in the game match.

The weight determination unit is configured to determine the weight based on the target evaluation indicator, and the size of the weight is positively correlated with the target evaluation indicator.

Optionally, the weight determination unit is configured to: determine the current game progress of the game match; and determine the weight based on the current game progress and the target evaluation indicator.

Optionally, the second determination module 602 is configured to: obtain the target communication period by inputting the current signal communication information and the current game state information into a trained model for period prediction.

The model for period prediction is obtained by training a machine learning model over training samples, and the training samples include signal communication information labeled with a communication period, and game state information.

Optionally, the signal communication information includes at least one of the following: content of a communication message triggered by the game role in the game match, and a type of signal to which the communication message belongs.

The game state information includes at least one of the following: role state data of the game role of the game match, a game progress where the game match is located, and a game environment where the game role is located.

Optionally, the signal communication feature includes at least one of the following: the frequency of the game role in the game match for sending communication messages, the number of times of the game role for sending communication messages, and a time point at which the game role sends communication messages.

The game state feature includes at least one of the following: a first situational indicator representing a winning or losing trend of the game match, and a second situational indicator representing the battle advantages and disadvantages between the game roles.

With regard to the apparatus 600 in the above embodiment, the specific manner in which each module executes operations has been described in detail in the embodiments related to the method, and thus will not be described in detail herein.

Figure 7:
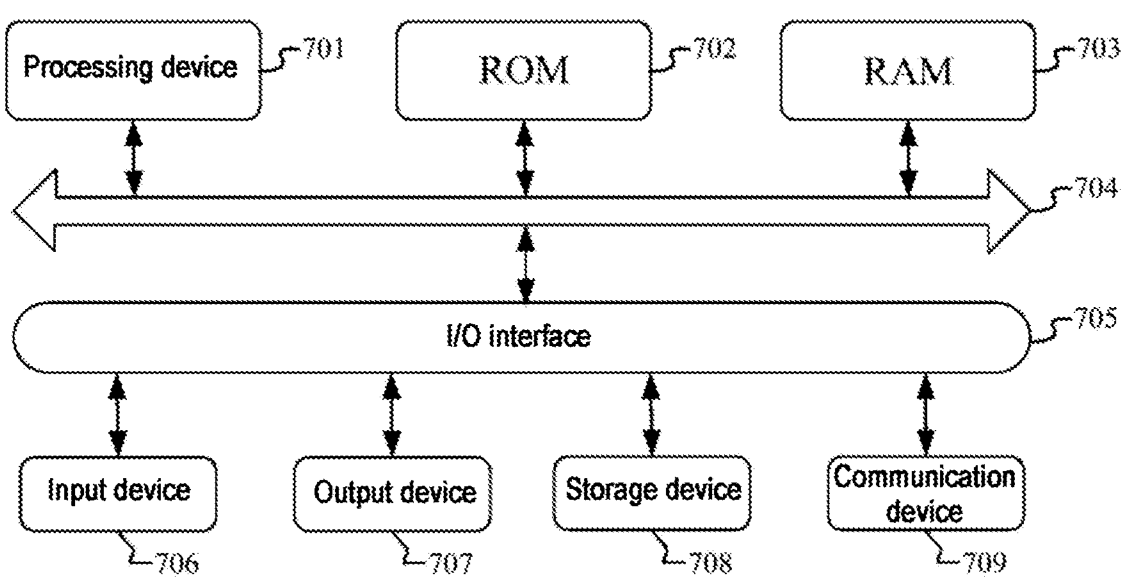
FIG. 7 is a schematic structural diagram illustrating an electronic device according to an exemplary embodiment.

Referring to FIG. 7, FIG. 7 illustrates a schematic structural diagram of an electronic device (for example, the terminal or the server in FIG. 1) 700 suitable for implementing the embodiments of the present disclosure. The terminal in the embodiments of the present disclosure may include, but is not limited to, mobile terminals such as a mobile phone, a laptop computer, a digital broadcast receiver, a PDA (personal digital assistant), a PAD (tablet computer), a PMP (portable multimedia player), a vehicle-mounted terminal (e.g., a vehicle-mounted navigation terminal), and fixed terminals such as a digital TV and a desktop computer. The electronic device shown in FIG. 7 is merely an example, and should not bring any limitation to the functions and use scopes of the embodiments of the present disclosure.

As shown in FIG. 7, the electronic device 700 may include a processing device (e.g., a central processing unit, a graphics processing unit or the like) 701, which may execute various appropriate actions and processing based on programs stored in a read-only memory (ROM) 702 or programs loaded from a storage device 708 into a random access memory (RAM) 703. Various programs and data necessary for the operations of the electronic device 700 may also be stored in the RAM 703. The processing device 701, the ROM 702 and the RAM 703 are connected with each other by a bus 704. An input/output (I/O) interface 705 is also connected to the bus 704.

Generally, the following devices may be connected to the I/O interface 705: an input device 706, including, for example, a touch screen, a touchpad, a keyboard, a mouse, a camera, a microphone, an accelerometer and a gyroscope; an output device 707, including, for example, a liquid crystal display (LCD), a speaker, a vibrator; the storage device 708, including, for example, a magnetic tape, a hard disk; and a communication device 709. The communication device 709 may allow the electronic device 700 to perform wireless or wired communication with other devices, so as to exchange data. Although FIG. 7 illustrates the electronic device 700 having various devices, it should be understood that, it is not required to implement or have all illustrated devices. More or fewer devices may be alternatively implemented or provided.

In particular, according to the embodiments of the present disclosure, the process described above with reference to the flowchart may be implemented as a computer software program. For example, the embodiments of the present disclosure include a computer program product, which includes a computer program carried on a non-transitory computer-readable medium, and the computer program includes program codes for executing the method shown in the flowchart. In such embodiments, the computer program may be downloaded and installed from a network by the communication device 709, or installed from the storage device 708, or installed from the ROM 702. When executed by the processing device 701, the computer program executes the above functions defined in the method in the embodiments of the present disclosure.

It should be noted that, the above computer-readable medium in the present disclosure may be a computer-readable signal medium or a computer-readable storage medium, or any combination of thereof. The computer-readable storage medium may be, for example, but is not limited to, electrical, magnetic, optical, electromagnetic, infrared, or semiconductor systems, apparatuses or devices, or any combination thereof. More specific examples of the computer-readable storage medium may include, but are not limited to, an electrical connection with one or more wires, a portable computer disk, a hard disk, a random access memory (RAM), a read-only memory (ROM), an erasable programmable read-only memory (EPROM or a flash memory), an optical fiber, a portable compact disk-read-only memory (CD-ROM), an optical storage device, a magnetic storage device, or any suitable combination thereof. In the present disclosure, the computer-readable storage medium may be any tangible medium that contains or stores programs for use by or in combination with instruction execution systems, apparatuses or devices. In the present disclosure, the computer-readable signal medium may include a data signal which is propagated in a baseband or as part of a carrier, in which computer-readable program codes are carried. Such a propagated data signal may take a variety of forms, including, but not limited to, electromagnetic signals, optical signals, or any suitable combination thereof. The computer-readable signal medium may also be any computer-readable medium other than the computer-readable storage medium, and the computer-readable signal medium may send, propagate, or transmit programs for use by or in combination with the instruction execution systems, apparatuses or devices. The program codes contained on the computer-readable medium may be transmitted by using any suitable medium, including, but not limited to: an electric wire, an optical cable, RF (radio frequency), and the like, or any suitable combination of thereof.

In some implementations, the terminal and the server may communicate by using any currently known or future developed network protocol, such as an HTTP (HyperText Transfer Protocol), and may be interconnected with a digital data communication (e.g., a communication network) of any form or medium. Examples of the communication network include a local area network ("LAN"), a wide area network ("WAN"), Internet network (e.g., the Internet), an end-to-end network (e.g., an ad hoc end-to-end network), as well as any currently known or future developed network.

The computer-readable medium may be contained in the electronic device; and may also exist alone, but is not assembled in the electronic device.

The computer-readable medium carries one or more programs, and when the one or more programs are executed by the electronic device, the electronic device executes the following operations: determining a target communication message to be sent by an intelligent agent in a game match; determining, based on current signal communication information triggered by the game match and current game state information of the game match, a target communication period corresponding to the intelligent agent; and in response to a time interval between a moment at which the intelligent agent sends a previous communication message and current moment matching the target communication period, controlling the intelligent agent to send the target communication message.

Computer program codes for executing the operations of the present application may be written in one or more programming languages or combinations thereof, the programming languages include, but are not limited to, object-oriented programming languages, such as Java, Smalltalk and C++, and also include conventional procedural programming languages, such as "C" language or similar programming languages. The program codes may be completely executed on a user computer, partly on the user computer, as a stand-alone software package, partly on the user computer and partly on a remote computer, or completely on the remote computer or a server. In the case involving the remote computer, the remote computer may be connected to the user computer by means of any kind of network, including a local area network (LAN) or a wide area network (WAN), or may be connected to an external computer (e.g., connected by means of the Internet by using an internet service provider).

The flowcharts and block diagrams in the drawings illustrate system architectures, functions and operations that may be implemented by the systems, methods and computer program products according to various embodiments of the present disclosure. In this regard, each block in the flowcharts or block diagrams may represent a part of a module, a program segment or a code, and a part of the module, the program segment or the code contains one or more executable instructions for implementing specified logical functions. It should also be noted that, in some alternative implementations, functions annotated in the boxes may also occur in a different order from those annotated in the drawings. For example, two consecutive blocks may, in fact, be executed substantially in parallel, and may also be executed in a reverse order sometimes, depending upon the functions involved. It should also be noted that, each block in the block diagrams and/or flowcharts, and combinations of the blocks in the block diagrams and/or flowcharts may be implemented by dedicated hardware-based systems, which are used for executing the specified functions or operations, or may be implemented by a combination of dedicated hardware and computer instructions.

The modules involved in the description of the embodiments of the present disclosure may be implemented in a software manner, and may also be implemented in a hardware manner. In some cases, the name of the module does not constitute a limitation on the module itself.

The above functions described herein may be executed, at least in part, by one or more hardware logic components. For example, non-restrictively, available hardware logic components of an exemplary type include: a field-programmable gate array (FPGA), an application-specific integrated circuit (ASIC), an application-specific standard product (ASSP), an on-chip system (SOC), a complex programmable logic device (CPLD), and the like.

In the context of the present disclosure, a machine-readable medium may be a tangible medium, which may contain or store programs for use by or in combination with instruction execution systems, apparatuses or devices. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk-read-only memory (CD-ROM), an optical storage device, a magnetic storage device, or any suitable combination of thereof.

The above description is merely illustration of preferred embodiments of the present disclosure and the applied technical principles. It should be understood by those skilled in the art that, the scope of disclosure involved in the present disclosure is not limited to technical solutions formed by particular combinations of the above technical features, and should also cover other technical solutions formed by any combination of the above technical features or equivalent features thereof without departing from the above disclosed concepts, for example, technical solutions formed by replacing the above features with technical features having similar functions disclosed in the present disclosure (but not limited to).

In addition, although various operations are depicted in a particular order, it should not be understood that these operations are required to be executed in the shown particular order or in sequential order. In certain environments, multitasking and parallel processing may be advantageous. Likewise, although several specific implementation details are contained in the above discussion, these should not be construed as limiting the scope of the present disclosure. Some features described in the context of separate embodiments may also be implemented in combination in a single embodiment. Conversely, various features described in the context of a single embodiment may also be implemented in a plurality of embodiments separately or in the form of any suitable sub-combination.

Although the present theme has been described in a language specific to structural features and/or method logical actions, it should be understood that the theme defined in the appended claims is not necessarily limited to the particular features or actions described above. Rather, the particular features or actions described above are merely exemplary forms of implementing the claims. With regard to the apparatus in the above embodiments, the specific manner in which each module executes operations has been described in detail in the embodiments related to the method, and thus will not be described in detail herein.

We claim:

1. A method for game role interaction control, comprising:

determining a target communication message to be sent by an intelligent agent in a game match;

determining, based on current signal communication information triggered by the game match and current game state information of the game match, a target communication period corresponding to the intelligent agent; and in response to a time interval between a moment at which the intelligent agent sends a previous communication message and a current moment matching the target communication period, controlling the intelligent agent to send the target communication message, wherein determining, based on the current signal communication information triggered by the game match and the current game state information of the game match, the target communication period corresponding to the intelligent agent comprises:

determining a historical signal communication feature based on signal communication information obtained at a historical moment of the game match, wherein the historical signal communication feature represents a preference of a game role in the game match for sending communication messages;

determining a historical game state feature based on game state information obtained at the historical moment of the game match, wherein the historical game state feature represents a historical game situation of the game match; and obtaining the target communication period by performing a weighted average operation on the current signal communication information, the current game state information, the historical signal communication feature and the historical game state feature and in combination with corresponding weights.

2. The method according to claim 1, wherein the weights are obtained by the following:

determining a type of game role to which the intelligent agent belongs and/or a competitive level corresponding to the intelligent agent;

obtaining a target evaluation indicator of the intelligent agent by inputting the type of game role and/or the competitive level into a scoring model, wherein the target evaluation indicator represents a frequency of the intelligent agent for sending communication messages in the game match; and determining the weights based on the target evaluation indicator, wherein sizes of the weights are positively correlated with the target evaluation indicator.

3. The method according to claim 2, wherein determining the weights based on the target evaluation indicator comprises:

determining a current game progress of the game match; and determining the weights based on the current game progress and the target evaluation indicator.

4. The method according to claim 1, wherein the signal communication information comprises at least one of the following:

content of a communication message triggered by a game role in the game match, or a type of signal to which the communication message belongs; and the game state information comprises at least one of the following:

role state data of the game role of the game match, a game progress where the game match is located, or a game environment where the game role is located.

5. The method according to claim 1, wherein the signal communication feature comprises at least one of the following:

a frequency of the game role in the game match for sending communication messages, a number of times of the game role sending communication messages, or a time point at which the game role sends communication messages; and the game state feature comprises at least one of the following:

a first situational indicator representing a winning or losing trend of the game match, or a second situational indicator representing battle advantages and disadvantages between game roles.

6. A non-transitory computer-readable storage medium storing a computer program thereon, wherein the program, when executed by a processor, performs:

determining a target communication message to be sent by an intelligent agent in a game match;

determining, based on current signal communication information triggered by the game match and current game state information of the game match, a target communication period corresponding to the intelligent agent; and in response to a time interval between a moment at which the intelligent agent sends a previous communication message and a current moment matching the target communication period, controlling the intelligent agent to send the target communication message, wherein determining, based on the current signal communication information triggered by the game match and the current game state information of the game match, the target communication period corresponding to the intelligent agent comprises:

determining a historical signal communication feature based on signal communication information obtained at a historical moment of the game match, wherein the historical signal communication feature represents a preference of a game role in the game match for sending communication messages;

determining a historical game state feature based on game state information obtained at the historical moment of the game match, wherein the historical game state feature represents a historical game situation of the game match; and obtaining the target communication period by performing a weighted average operation on the current signal communication information, the current game state information, the historical signal communication feature and the historical game state feature and in combination with corresponding weights.

7. The non-transitory computer-readable storage medium according to claim 6, wherein the weights are obtained by the following:

determining a type of game role to which the intelligent agent belongs and/or a competitive level corresponding to the intelligent agent;

obtaining a target evaluation indicator of the intelligent agent by inputting the type of game role and/or the competitive level into a scoring model, wherein the target evaluation indicator represents a frequency of the intelligent agent for sending communication messages in the game match; and determining the weights based on the target evaluation indicator, wherein sizes of the weights are positively correlated with the target evaluation indicator.

8. The non-transitory computer-readable storage medium according to claim 7, wherein determining the weights based on the target evaluation indicator comprises:

determining a current game progress of the game match; and determining the weights based on the current game progress and the target evaluation indicator.

9. The non-transitory computer-readable storage medium according to claim 6, wherein the signal communication information comprises at least one of the following:

content of a communication message triggered by a game role in the game match, or a type of signal to which the communication message belongs; and the game state information comprises at least one of the following:

role state data of the game role of the game match, a game progress where the game match is located, or a game environment where the game role is located.

10. The non-transitory computer-readable storage medium according to claim 6, wherein the signal communication feature comprises at least one of the following:

a frequency of the game role in the game match for sending communication messages, a number of times of the game role sending communication messages, or a time point at which the game role sends communication messages; and the game state feature comprises at least one of the following:

a first situational indicator representing a winning or losing trend of the game match, or a second situational indicator representing battle advantages and disadvantages between game roles.

11. An electronic device, comprising:

a memory storing a computer program thereon; and a processor for execution of the computer program in the memory to performs:

determining a target communication message to be sent by an intelligent agent in a game match;

determining, based on current signal communication information triggered by the game match and current game state information of the game match, a target communication period corresponding to the intelligent agent; and in response to a time interval between a moment at which the intelligent agent sends a previous communication message and a current moment matching the target communication period, controlling the intelligent agent to send the target communication message, wherein determining, based on the current signal communication information triggered by the game match and the current game state information of the game match, the target communication period corresponding to the intelligent agent comprises:

determining a historical signal communication feature based on signal communication information obtained at a historical moment of the game match, wherein the historical signal communication feature represents a preference of a game role in the game match for sending communication messages;

determining a historical game state feature based on game state information obtained at the historical moment of the game match, wherein the historical game state feature represents a historical game situation of the game match; and obtaining the target communication period by performing a weighted average operation on the current signal communication information, the current game state information, the historical signal communication feature and the historical game state feature and in combination with corresponding weights.

12. The electronic device according to claim 11, wherein the weights are obtained by the following:

determining a type of game role to which the intelligent agent belongs and/or a competitive level corresponding to the intelligent agent;

obtaining a target evaluation indicator of the intelligent agent by inputting the type of game role and/or the competitive level into a scoring model, wherein the target evaluation indicator represents a frequency of the intelligent agent for sending communication messages in the game match; and determining the weights based on the target evaluation indicator, wherein sizes of the weights are positively correlated with the target evaluation indicator.

13. The electronic device according to claim 12, wherein determining the weights based on the target evaluation indicator comprises:

determining a current game progress of the game match; and determining the weights based on the current game progress and the target evaluation indicator.

14. The electronic device according to claim 11, wherein the signal communication information comprises at least one of the following:

content of a communication message triggered by a game role in the game match, or a type of signal to which the communication message belongs; and the game state information comprises at least one of the following:

role state data of the game role of the game match, a game progress where the game match is located, or a game environment where the game role is located.

* * * * *